United States Patent [19]

Kirk

[11] Patent Number: 5,335,318
[45] Date of Patent: Aug. 2, 1994

[54] ELECTRONIC IMAGE GENERATION APPARATUS INCLUDING A CAMERA FOR RECORDING A REGION AND PRODUCING A CONTROL DATA ARRAY

[75] Inventor: Richard A. Kirk, Herts, England

[73] Assignee: Crosfield Electronics Limited, Hemel Hempstead, England

[21] Appl. No.: 836,448

[22] Filed: Jun. 10, 1992

[30] Foreign Application Priority Data

Jul. 1, 1991 [GB] United Kingdom ............ 9114152.3

[51] Int. Cl.⁵ ............................................. G06F 13/00
[52] U.S. Cl. ................................... 395/131; 395/135
[58] Field of Search ............... 395/131, 116, 133, 135; 358/448, 452, 75

[56] References Cited

U.S. PATENT DOCUMENTS

| | | | |
|---|---|---|---|
| 4,954,912 | 9/1990 | MacDonald et al. | 358/448 |
| 5,060,171 | 10/1991 | Steir et al. | 395/135 |
| 5,089,891 | 2/1992 | Yamamoto | 358/164 |
| 5,132,670 | 7/1992 | Miller | 340/703 |
| 5,214,512 | 5/1993 | Freeman | 358/183 |

FOREIGN PATENT DOCUMENTS

| | | |
|---|---|---|
| 0202747 | 11/1986 | European Pat. Off. . |
| 0226959 | 7/1987 | European Pat. Off. . |
| 0403253 | 12/1990 | European Pat. Off. . |
| 3836178 | 7/1990 | Fed. Rep. of Germany . |
| 0344976 | 5/1989 | United Kingdom . |
| 0441498 | 1/1991 | United Kingdom . |

*Primary Examiner*—Gary V. Harkcom
*Assistant Examiner*—Michael Smith
*Attorney, Agent, or Firm*—Sughrue, Mion, Zinn, Macpeak & Seas

[57] ABSTRACT

Electronic image generation apparatus includes a monitor, a colour data array for storing digital data defining the colour component content of pixels of an image, a control data array for storing control data for each display pixel, and a mixer connected to the control data array and the colour data array for generating display pixel data comprised of a combination of proportions of the data in the colour data stores and other colour data the proportions being in accordance with the control data. The monitor is responsive to the display pixel data. A camera views a region within which an indicator may be moved, and is connected to the control data array such that data relating to the appearance of the region is recorded in the control data array.

6 Claims, 1 Drawing Sheet

ELECTRONIC IMAGE GENERATION APPARATUS INCLUDING A CAMERA FOR RECORDING A REGION AND PRODUCING A CONTROL DATA ARRAY

FIELD OF THE INVENTION

The invention relates to electronic image generation apparatus and particularly such apparatus which enables a graphic artist to create images which are recorded and stored electronically.

DESCRIPTION OF THE PRIOR ART

It would be desirable to make many of the conventional, creative techniques of the graphic artist available to the computer user. So far the approach has almost universally been to try and simulate airbrushing, painting, chalking and the like digitally. This has had only limited success. Another approach is to use the original tools of the graphic artist and then scan the result in a conventional manner. This has the disadvantage that all the graphic elements have to be created. Furthermore, the appearance of the original has to be accurately matched to its appearance on a monitor leading to more complex processing.

SUMMARY OF THE INVENTION

In accordance with the present invention, electronic image generation apparatus comprises a monitor; a colour data array for storing digital data defining the colour component content of pixels of an image; a control data array for storing control data for each display pixel; mixing means connected to the control data array and the colour data array for generating display pixel data comprising a combination of proportions of the data in the colour data stores and other colour data, the proportions being in accordance with the control data, the monitor being responsive to the display pixel data; and a camera for viewing a region within which an indicator may be moved, the camera being connected to the control data array such that data relating to the appearance of the region is recorded in the control data array.

We have devised a new type of apparatus which enables analogue techniques to be used so that the benefits of techniques such as speed, feel, and textures can be obtained while storing the results of these analogue techniques digitally.

In the main applications of this invention, the data recorded in the control data array will define the appearance of the region viewed by the camera. For example, lines, airbrushes and the like can be stored. However, the invention is also applicable to causing the display of an icon on the monitor whose shape and/or position depends on the appearance of the region. For example, an icon may be moved about the display in accordance with the position of an indicator, such as the user's finger, as viewed by the camera.

In one application, the appearance of the region viewed by the camera is stored in digital form directly in the control data array. The result of this will be that the monitor will display not only any line being drawn but also the indicator such as a pen and the arm of the user holding the indicator.

In a more sophisticated application, the apparatus further comprises a memory for storing a reference image of the region, and subtraction means for subtracting the reference image from the current image, the difference being stored in the control data array. In this application, the appearance of any substrate in the region can be subtracted.

In a third application, the apparatus further comprises a memory for storing a reference image of the region, and subtraction means for subtracting the reference image from the current image, the difference being added to the data in the control data array. This provides an alternative to the second application but requires that the appearance of the user's arm and indicator are no longer seen. In general, however, it is desirable to provide means for displaying the current position of the user's arm. This could be done, for example, by providing an indicator which generates light, the apparatus further comprising sensing means for sensing signals that are lighter than the substrate and thereby causing those signals to be added to the control data array, the sensing means causing signals which are darker than the substrate (for example the user's arm) being utilized temporarily to cause an overlay display.

It will be appreciated that by storing the appearance of the region as control data, mistakes in the pattern being drawn can be easily erased and replaced and it is only when the resultant appearance on the monitor is satisfactory that the "image" defined in the control data array is combined with any image stored in the colour data array. It will be appreciated, of course, that initially the image being drawn will be mixed non-destructively with the image stored in the colour data array for display on the monitor.

The camera may comprise a conventional T.V. camera or flying spot scanner but preferably comprises a CCD array. CCD arrays are preferred because they are easily available with large pixel numbers, their effective resolution can be varied by moving the camera and they are usually designed with anti-aliasing in mind. It is also possible to make the CCDs sensitive to narrow spectral bands in the visible or infra-red spectrum in order to reject spurious signals.

Preferably, the camera is arranged on the same side of the region to be viewed as the indicator. However, in other applications the camera and any light source could be positioned on the side of the region opposite to the indicator so that the dark regions where internally refracting light escapes when the surface is touched by a brush or a finger is imaged. It would also be possible to back light the region.

The colour which is mixed with the colours defined by the colour data array will be a colour chosen by the user.

BRIEF DESCRIPTION OF THE DRAWINGS

Some examples of electronic image generation apparatus according to the invention will now be described with reference to the accompanying drawings, in which.

DETAILED DESCRIPTION OF THE EMBODIMENTS

Figure 1:
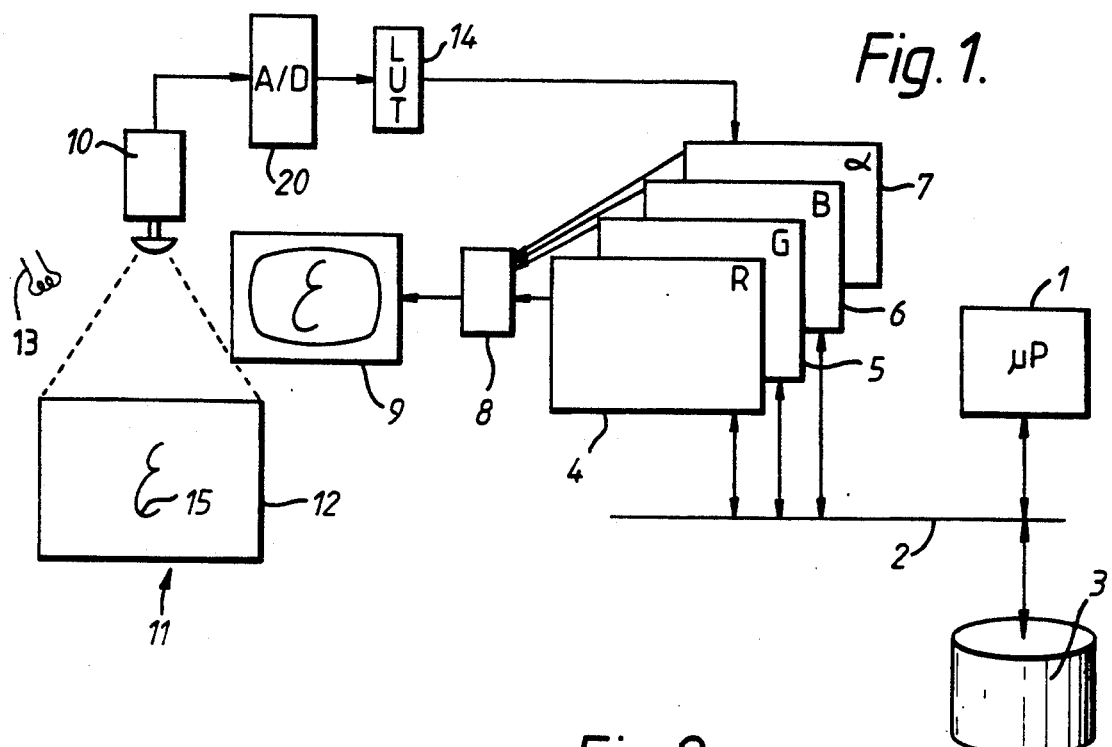
FIGS. 1–3 are block diagrams illustrating three different examples of the apparatus.

The apparatus shown in FIG. 1 comprises a microprocessor 1 coupled to a data bus 2. The bus 2 is connected to a disc store 3 which stores digital data defining the colour component content of images. The bus 2 is also connected to three framestores 4–6 for storing digital data defining the colour component content (red, green and blue respectively) of an image to be displayed. This data will have been down loaded from the disc store 3 under the control of the microprocessor 1. A fourth frame store 7, known as the α plane, is provided, all four frame stores being connected to a mixer circuit 8 whose output is connected to a monitor 9. In other examples (not shown) other colour spaces such as cyan, magenta, yellow and black could be used. The mixer circuit 8 responds to control data in the α plane 7 to determine for each displayed pixel a resultant colour defined as a combination of some predetermined colour or image and a proportion of the corresponding colours stored in the stores 4–6. The proportions are determined by the 8 bit values stored in the relevant pixel in the α plane 7. The use of a control data store or mask store similar to the α plane 7 is well known for mixing images. For example refer to EP-A-0344976 (which corresponds to U.S. Pat. No. 4,954912) and EP-A-0441498 incorporated herein by reference.

The content of the α plane 7 is determined via a camera 10 containing a two-dimensional CCD array which receives illumination from a region 11 which will normally contain a substrate such as paper 12. The region 11 is illuminated by a white light source 13. Light received by the camera 10 is digitized by an analogue-to-digital converter 20 and if necessary modified by a look-up table (LUT) 14 to take account of inherent errors in the camera performance, the resultant 8 bit data which represents the line density detected by the camera 10 then being stored in appropriate pixels of the α plane 7.

In use, the operator may place a sheet of paper 12 in the region 11 and cause the monitor 9 to display some previously scanned image obtained from the disc store 3 as previously described. The user then draws using a pencil or paintbrush directly onto the paper 12 some desired pattern 15. The camera 10 views the region 11 and generates a digital value for each viewed pixel i.e. representing on a grey level (0–255) the intensity of the pixels of the pattern 15 and the colour of the paper itself. This data after processing in the LUT 14 is then stored in the α plane 7 which is continuously refreshed by the camera 10. The mixer circuit 8 responds to the current content of the α plane 7 to display on the monitor 9 the result of combining the previously displayed image as stored in the frame stores 4–6 with the pattern defined in the α plane 7. If α represents a value in the α plane 7, then the displayed pixel will have colour components given by the formula:

(1-α) Framestore +α x colour where "colour" is some colour selected by the user.

It will be noted that the contents of the frame stores 4–6 have not been modified. Consequently, the monitor 9 simply provides an indication of the overall appearance of the composite image. If the operator is satisfied with the displayed image he can indicate this to the microprocessor 1 which will then write the composite image data into the frame stores 4–6 as a permanent record. If the operator is dissatisfied he can simply clear the α plane 7 by replacing the paper 12 with a blank sheet and start again. It will be noted that in general not only the pattern 15 will be viewed but also the appearance of the indicator itself such as a paintbrush, and the user's arm as viewed by the camera 10.

Figure 2:
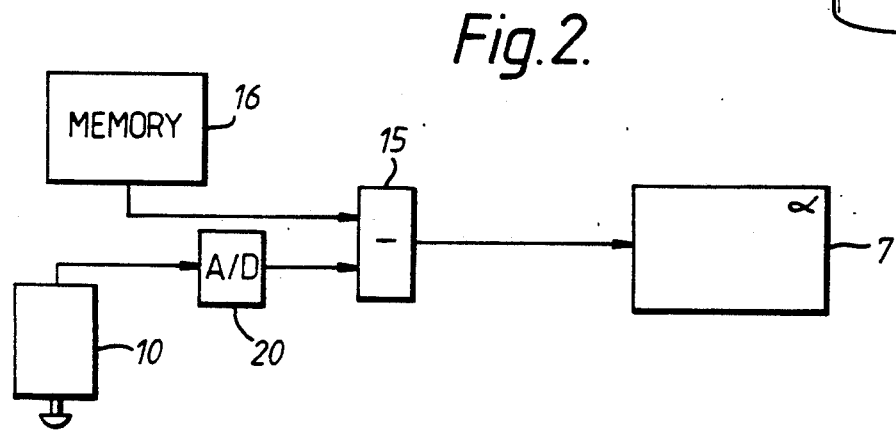

FIG. 2 illustrates a modified form of the apparatus shown in FIG. 1 and only the α plane framestore 7 is illustrated. In this case, the output from the camera 10 is fed to a subtraction circuit 15 to which is also fed the contents of the reference memory 16. The reference memory 16 has previously been set up to store some reference image such as the appearance of the substrate or paper before any pattern has been written on it. The digital values from the memory 16 are then subtracted from the corresponding values from the camera 10 so that the reference image is subtracted from the viewed image and the result stored in the α plane 7. This has the effect of subtracting the colours of the substrate while still obtaining the effects of texture etc. In addition, the user's arm and the tool he is using will also be seen on the monitor.

Figure 3:
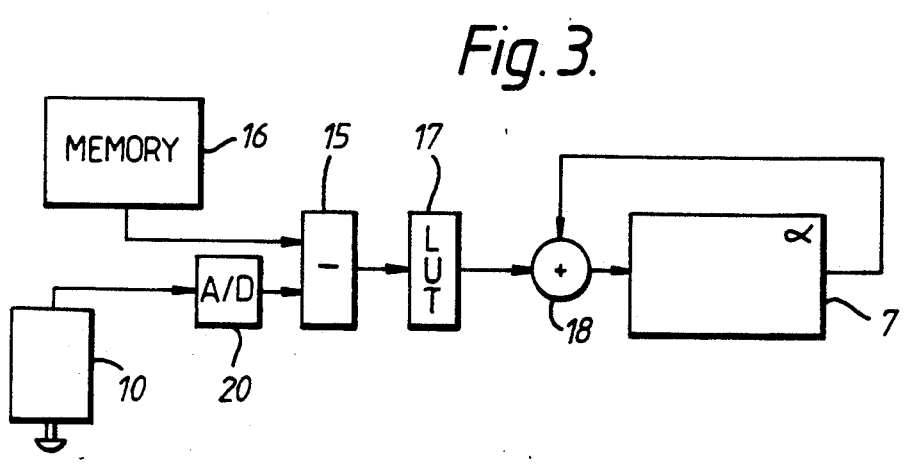

FIG. 3 illustrates a modification of the FIG. 2 example in which the output of the subtractor 15 is fed via a look-up table 17, similar to the LUT 14, to an adding circuit 18. The other input to the adding circuit 18 is obtained directly from the existing or current contents of the α plane 7. Thus, in this example the difference between the current image from the camera and the reference image from the memory 16 is continuously added to the current α plane. In this case, it is important that the users arm and the tool he is using are no longer seen or they will become a permanent part of the α plane data. However, it is still important that the users arm and the tool can be viewed on the monitor 9.

There are a number of ways of achieving this. For example, the tool could be in the form of a light source instead of an airbrush or pen. It is then only necessary to add signals that are lighter than the paper to the e plane 7. Signals that are darker than the paper, for example the user's arm, could be temporarily overlaid in another colour.

It will be noted in FIG. 1 that the light source 13 and camera 10 are provided on the same side of the paper 12. It would, however, be possible to provide the light source on one side and the camera on the other, providing the substrate is translucent or to provide both the light source 13 and camera 10 on the opposite side of the paper to that on which the user will draw patterns.

I claim:

1. Electronic image generation apparatus comprising a monitor; a colour data array for storing digital data defining the colour component content of pixels of an image; a control data array for storing control data for each display pixel; mixing means connected to said control data array and said colour data array for generating display pixel data comprising a combination of proportions of the data in the colour data arrays and other predetermined colour data, said proportions being in accordance with the control data, said monitor being responsive to said display pixel data; and a camera for viewing a region within which an indicator may be moved, the camera being connected to the control data array such that data relating to the appearance of the region is recorded in the control data array.

2. Apparatus according to claim 1, wherein the appearance of said region viewed by said camera is stored in digital form directly in said control data array.

3. Apparatus according to claim 1, further comprising a memory for storing a reference image of the region, subtraction means for subtracting data representing said reference image from data representing a current image, the difference being stored in said control data array.

4. Apparatus according to claim 1, further comprising a memory for storing a reference image of the region, and subtraction means for subtracting data representing the reference image from data representing a current image; and adding means for adding a difference to the data in the control data array.

5. Apparatus according to claim 1, further comprising an indicator which generates light, sensing means for sensing signals that are lighter than and darker than a substrate, means for causing the signals that are lighter than the substrate to be added to the control data array, and means for producing an overlay display based on the signals that are darker than the substrate.

6. Electronic image generation apparatus comprising a monitor; a colour data array for storing digital data defining the colour component content of pixels of an image; a control data array for storing control data for each display pixel; a colour data store for storing digital data defining the colour component content of pixels of one or more predetermined images; mixing means connected to said control data array and said colour data array for generating display pixel data comprising a combination of proportions of the data in the colour data array and other predetermined colour data from the colour data store, said proportions being in accordance with the control data, said monitor being responsive to said display pixel data; and a camera for viewing a region within which an indicator may be moved, the camera being connected to the control data array such that data relating to the appearance of the region is recorded in the control data array, wherein the digital data stored in the colour data array is replaced by the combined display pixel data when the appearance of the monitor is deemed satisfactory.

* * * * *